(12) United States Patent
Bumann

(10) Patent No.: US 8,303,864 B2
(45) Date of Patent: Nov. 6, 2012

(54) FIRE-RETARDING SHEET MATERIAL HAVING A METALLIC EFFECT

(75) Inventor: Detlef Bumann, Alsbach-Haehnlein (DE)

(73) Assignee: Evonik Rohm GmbH, Darmstadt (DE)

( * ) Notice: Subject to any disclaimer, the term of this patent is extended or adjusted under 35 U.S.C. 154(b) by 146 days.

(21) Appl. No.: 11/569,752

(22) PCT Filed: Jun. 16, 2005

(86) PCT No.: PCT/EP2005/006452
§ 371 (c)(1),
(2), (4) Date: Nov. 29, 2006

(87) PCT Pub. No.: WO2006/024331
PCT Pub. Date: Mar. 9, 2006

(65) Prior Publication Data
US 2007/0228342 A1   Oct. 4, 2007

(30) Foreign Application Priority Data
Aug. 30, 2004   (DE) .................. 10 2004 042 095

(51) Int. Cl.
*C09K 21/00* (2006.01)
*C04B 14/20* (2006.01)

(52) U.S. Cl. ................. 252/609; 106/417; 106/418

(58) Field of Classification Search ......... 106/400, 106/417; 427/453; 252/609
See application file for complete search history.

(56) References Cited

U.S. PATENT DOCUMENTS

| | | | | |
|---|---|---|---|---|
| 5,108,835 A | * | 4/1992 | Hahnsen et al. | 428/334 |
| 5,391,600 A | * | 2/1995 | Umeda et al. | 524/267 |
| 5,837,757 A | * | 11/1998 | Nodera et al. | 524/87 |
| 6,376,075 B1 | * | 4/2002 | Tacke-Willemsen et al. | 428/402 |
| 6,841,240 B2 | * | 1/2005 | Gorny et al. | 428/323 |
| 6,893,689 B2 | * | 5/2005 | Dobler et al. | 428/31 |
| 7,351,474 B2 | * | 4/2008 | Etzrodt et al. | 428/407 |
| 2003/0032755 A1 | * | 2/2003 | Gorny et al. | 528/44 |
| 2003/0148093 A1 | | 8/2003 | Gorny et al. | |
| 2004/0044119 A1 | * | 3/2004 | Etzrodt et al. | 524/543 |
| 2005/0175818 A1 | * | 8/2005 | Kawabata et al. | 428/195.1 |

FOREIGN PATENT DOCUMENTS

| | | |
|---|---|---|
| EP | 0 932 024 | 7/1999 |
| JP | 06-322250 A | 11/1994 |
| WO | 01/60902 | 8/2001 |
| WO | WO/01/60902 * | 8/2001 |
| WO | 02/062900 A1 | 8/2002 |

OTHER PUBLICATIONS

"Iriodin for Plastic" Apr. 7, 2000 Merck.*
Degussa-Roehm Plexiglas: "Europlex F, Europlex PPSU" Flame Retardant Sheet Products for Aircraft Applications, Jun. 2004.
Anthony James: Aircraft Interiors International, "Full House", Jun. 20 , pp. 64-66, 69-71, 73, 74.
Iriodin for Plastics, "Merck", pp. 1-15.
Merck, MSDS, Iriodin 123 Bright Lustre Satin, Date of issue: Aug. 11, 1999, pp. 1-4.
Kalzip Systems, Colours and Finishes, Internet Publication Dec. 13, 2003.
Aircraft Materials Fire Test Handbook, DOT/FAA/AR-00/12, Office of Aviation Research, Washington, D.C. 20591, Apr. 2000.

* cited by examiner

*Primary Examiner* — Peter F Godenschwager
(74) *Attorney, Agent, or Firm* — Oblon, Spivak, McClelland, Maier & Neustadt, L.L.P.

(57) ABSTRACT

Flame-retardant plastics mouldings composed of polyphenyl sulphones (PPSUs) or of polycarbonates (PCs) are coloured with Iridoin® pigments in such a way as to have a metallic effect. The effect is resistant to the usual stresses present in an aircraft cabin and complies with the respective fire-protection requirements.

24 Claims, No Drawings

FIRE-RETARDING SHEET MATERIAL HAVING A METALLIC EFFECT

FIELD OF THE INVENTION

The invention relates to plastics mouldings which have a metallic-effect surface, and to their use in interior trim of aircraft.

1. Prior Art

Plastics mouldings for the interior trim of aircraft are known and are marketed with the name Furoplex® F and Europlex® PPSU by Röhm GmbH & Co. KG.

Europlex® F are impact-resistant, flame-retardant grades of polycarbonate (PC) with opaque pigmentation, and similarly Furoplex® PPSU are impact-resistant flame-retardant polyphenyl sulphones (PPSUs) with opaque pigmentation, these materials meeting the requirements of the OSU 65/65 test (heat release test to FAR 25.853) PC complies with the requirements of FAR 25.853 (a) (1) (i) (a) (1) (ii), and also complies with the requirements for smoke density and toxicity and PPSU also complies with the requirements of FAR 25.853 (c).

The panels are supplied in thicknesses of from 0.8 to 8.0 mm, and the width is at most 1400 mm Examples of products manufactured from the panels are seat coverings, trays, door coverings, door frame coverings and lamp casings.

2. Object

Metallic-effect coatings have usually been used hitherto in order to provide metallic-effect decoration to the opaque plastics mouldings based on non-transparent moulding compositions and composed of Europlex® F or Europlex® PPSU. However, coatings have the disadvantage of being not particularly scratch- and impact-resistant, the result being that everyday operations in the aircraft cabin rapidly make the coated articles unsightly.

The use of conventional metal pigments in opaque parent moulding compositions naturally does not achieve the effect of a coating. Furthermore, conventional metallic-effect pigments based on finely ground metal particles impair the fire performance of the plastics mouldings equipped therewith, because they have wicking action.

Object

An object was therefore to develop a moulding composition with, for example, a typical metallic effect for plastics mouldings, which does not impair the fire properties of the plastics mouldings in such a way that these plastics mouldings cannot be used in aircraft construction. The metallic-effect surface should moreover be robust with respect to the usual stresses in an aircraft cabin. The perceived colour of the metallic-effect surface should, for example, correspond to the shades PAL 9000/9007. The pigments used should be stable at the processing temperature of PPSU (about 350-380° C. screw temperature during extrusion).

Parent materials with opaque pigmentation (or opaque parent materials) cannot achieve adequate metallic effect (the effect being occluded). The starting situation based on transparent parent mouldings compositions is better, but here too there is the problem of effect on fire performance Achievement of Objects The objects are achieved via a flame-retardant plastics mouldings based on transparent, flame-retardant PC and PPSU moulding compositions with metallic-effect surface, the pigment used comprising Iriodin® pigment plus, if appropriate, colorants affecting shade.

Execution of the Invention

Plastics which may be used for the plastics moulding comprise not only transparent flame-retardant polycarbonate (PC) but also polysulphones (PSUs), polyphenyl sulphones (PPSUs) and polyether sulphones (PESs) (producer: Bayer AG, BASF, Solvay).

Iriodin® pigments are marketed by Merck KGaA.

By way of example, the Iriodin® pigments are incorporated in the form of a masterbatch composed of the corresponding plastic and the Iriodin® pigment. The masterbatch is composed of from 2 to 50% by weight of Iriodin® pigments the remainder being plastics pellets. If appropriate, the conventional auxiliaries or colorants can be added.

To extrude the plastics moulding, an amount of masterbatch is added to the plastics moulding composition such that the amount of Iriodin® pigment corresponds to that prescribed in the mixing specification.

A conventional extruder is used to extrude the inventive formulation to give sheets. The melt temperature in the case of PPSU is about 350-380° C., and the temperature of polishing stack is about 180° C., and in the case of polycarbonate the melt temperature is about 270-280° C. and that of the polishing stack is about 120° C.

Conventional processes such as thermoforming, can be used for further forming of the plastics moulding. The metals gold, silver, antique silver or copper can be imitated via variation of the concentration of Iriodin® pigment and of colour.

EXAMPLES

Example 1

Formulation

| | |
|---|---|
| PPSU moulding composition, transparent (Europlex PPSU 99470) | 98.799% |
| Iriodin 123 Bright Lustre Satin | 1% |
| Colortek OT-0005-BON | 0.2% |
| Printex ® 60 (Degussa) | 0.001% |

The mixture is used to extrude sheets of thickness 1.5 mm.

Example 2

Sheets of thickness 1 mm are extruded from a mixture identical with that in Example 1.

Example 3

Sheets of thickness 2.0 mm are extruded from a mixture identical with that in Example 1.

Comparative Example 4

Formulation

| | |
|---|---|
| PPSU moulding composition, transparent (Europlex PPSU 99470) | 99.00% |
| Metal pigment | 1.0% |

In Example 4, a commercially available ground metal powder (metal pigment) was incorporated instead of Iriodin® into a mixture identical with that in Example 1, and extruded to give sheets of thickness 1.5 mm.

Comparative Example 5

A mixture, including metal pigment, identical with that in Example 4 was extruded to give sheets of thickness 1.5 mm. Results of heat release test to FAR 25.853

| Example | Specimen | Limiting HR value (kW min/m$^2$) | Limiting HRR value (kW/m$^2$) | Requirements are: |
|---|---|---|---|---|
| 1 | 1 | 17.21 | 52.22 | Met |
|   | 2 | 22.63 | 48.04 |     |
|   | 3 | 4.66  | 34.27 |     |
| 2 | 1 | 16.80 | 37.48 | Met |
|   | 2 | 10.95 | 22.64 |     |
|   | 3 | 33.60 | 41.08 |     |
| 3 | 1 | −5.92 | 50.03 | Met |
|   | 2 | −0.45 | 58.59 |     |
|   | 3 | −3.30 | 56.94 |     |
| Comp. ex. 4 | 1 | 144.68 | 157.73 | Not met |
|             | 2 | 125.28 | 137.70 |         |
|             | 3 | 144.15 | 162.67 |         |
| Comp. ex. 5 | 1 | 158.63 | 154.31 | Not met |
|             | 2 | 173.26 | 179.95 |         |
|             | 3 | 123.61 | 131.62 |         |

Heat release from these specimens (measured in kW min/m$^2$/kW/m$^2$) is markedly below the prescribed limits of 65/65 kW min/m$^2$/kW/m$^2$ (HR/HRR) when the inventive formulation is used.

The invention claimed is:

1. A flame-retardant plastic sheet article comprising a flame-retardant plastic molding composition comprising:
   a flame-retardant plastic comprising at least one polymer selected from the group consisting of a polycarbonate, a polysulfone, a polyphenylsulfone, and a polyethersulfone;
   a pigment comprising either flakes of natural mica coated with a metal oxide selected from the group consisting of titanium dioxide, iron (III) oxide, and a mixture of titanium dioxide and iron (III) oxide, or 5-25 µm particles of mica coated with titanium dioxide and tin oxide; and
   a colorant other than the pigment,
   wherein the pigment is present in an amount of from 0.1 wt. % to 2 wt. %, based on a total weight of the flame-retardant plastic molding composition, and
   wherein the flame-retardant plastic molding composition exhibits a gold, copper, silver or aluminum metallic surface effect.

2. The flame-retardant plastic sheet article according to claim 1, wherein the flame-retardant plastic comprises a polycarbonate.

3. The flame-retardant plastic sheet article according to claim 1, wherein the flame-retardant plastic comprises a polysulfone.

4. The flame-retardant plastic sheet article according to claim 1, wherein the flame-retardant plastic comprises a polyphenylsulfone.

5. The flame-retardant plastic sheet article according to claim 1, wherein the flame-retardant plastic comprises a polyethersulfone.

6. The flame-retardant plastic sheet article according to claim 1, wherein the flame-retardant plastic is transparent.

7. The flame-retardant plastic sheet article according to claim 1, wherein the pigment comprises flakes of natural mica coated with a mixture of titanium dioxide and iron(III) oxide.

8. The flame-retardant plastic sheet article according to claim 1, wherein the pigment comprises 5-25 µm particles of mica coated with titanium dioxide and tin oxide.

9. The flame-retardant plastic sheet article according to claim 1, wherein the flame-retardant plastic molding composition exhibits a gold metallic surface effect.

10. The flame-retardant plastic sheet article according to claim 1, wherein the flame-retardant plastic molding composition exhibits a copper metallic surface effect.

11. The flame-retardant plastic sheet article according to claim 1, wherein the flame-retardant plastic molding composition exhibits a silver metallic surface effect.

12. The flame-retardant plastic sheet article according to claim 1, wherein the flame-retardant plastic molding composition exhibits an antique silver metallic surface effect.

13. The flame-retardant plastic sheet article according to claim 1, wherein the flame-retardant plastic molding composition exhibits an aluminum metallic surface effect.

14. The flame-retardant plastic sheet article according to claim 13, wherein the flame-retardant plastic molding composition exhibits a white aluminum RAL 9006 metallic surface effect.

15. The flame-retardant plastic sheet article according to claim 13, wherein the flame-retardant plastic molding composition exhibits a grey aluminum RAL 9007 metallic surface effect.

16. The flame-retardant plastic sheet article according to claim 1, wherein the flame-retardant plastic molding composition satisfies the fire retardancy requirements set forth in Federal Aviation Regulation 25.853.

17. The flame-retardant plastic sheet article according to claim 1, wherein the flame-retardant plastic molding composition exhibits an average maximum heat release rate of less than or equal to 65 kW/m$^2$ during a burn period of 5 minutes and an average total heat release of less than or equal to 65 kW·min/m$^2$ during a burn period of 2 minutes.

18. The flame-retardant plastic sheet article according to claim 1, wherein the flame-retardant plastic sheet article has a thickness of 1.0-12 mm.

19. The flame-retardant plastic sheet article according to claim 1, wherein the pigment comprises flakes of natural mica coated with titanium dioxide.

20. The flame-retardant plastic sheet article according to claim 1, wherein the pigment comprises flakes of natural mica coated with iron(III) oxide.

21. The flame-retardant plastic sheet article according to claim 1, wherein the flame-retardant plastic comprises a polyphenylsulfone and one or more polymers selected from the group consisting of a polycarbonate, a polysulfone, and a polyethersulfone.

22. The flame-retardant plastic sheet article according to claim 1, wherein the flame-retardant plastic comprises a polyphenylsulfone and a polycarbonate.

23. A process for producing the flame-retardant plastic sheet article according to claim 1, wherein said process comprises:
   mixing the flame-retardant plastic, the pigment and the colorant together to produce the flame-retardant plastic molding composition in a form of a mixture; and
   extruding the mixture to produce the flame-retardant plastic sheet article.

24. The process according to claim 23, wherein the flame-retardant plastic sheet article has a thickness of 1.0-12 mm.

* * * * *